United States Patent
Matsui et al.

(10) Patent No.: US 9,487,627 B2
(45) Date of Patent: Nov. 8, 2016

(54) CURABLE POLYSILSESQUIOXANE COMPOUND, METHOD FOR PRODUCING SAME, CURABLE COMPOSITION, CURED PRODUCT, AND METHOD FOR USING CURABLE COMPOSITION OR THE LIKE

(71) Applicant: LINTEC Corporation, Tokyo (JP)

(72) Inventors: Masami Matsui, Tokyo (JP); Mikihiro Kashio, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/439,503

(22) PCT Filed: Oct. 30, 2013

(86) PCT No.: PCT/JP2013/079362
§ 371 (c)(1),
(2) Date: Apr. 29, 2015

(87) PCT Pub. No.: WO2014/069508
PCT Pub. Date: May 8, 2014

(65) Prior Publication Data
US 2015/0299396 A1    Oct. 22, 2015

(30) Foreign Application Priority Data
Oct. 30, 2012  (JP) ................. 2012-239480

(51) Int. Cl.
| C08G 77/04 | (2006.01) |
| C08L 83/04 | (2006.01) |
| C08K 5/5415 | (2006.01) |
| C08G 77/38 | (2006.01) |
| C08G 77/00 | (2006.01) |

(52) U.S. Cl.
CPC .............. *C08G 77/04* (2013.01); *C08G 77/38* (2013.01); *C08K 5/5415* (2013.01); *C08L 83/04* (2013.01); *C08G 77/80* (2013.01)

(58) Field of Classification Search
None
See application file for complete search history.

(56) References Cited

U.S. PATENT DOCUMENTS

| 3,428,599 A * | 2/1969 | Newing, Jr. ........... C08G 77/06 156/329 |
| 2002/0082338 A1 * | 6/2002 | Furuya ..................... B05D 7/54 524/588 |
| 2003/0236347 A1 * | 12/2003 | Furuya ................. C09D 183/14 524/588 |
| 2008/0290472 A1 * | 11/2008 | Yagihashi ................ C08K 3/36 257/632 |
| 2009/0005530 A1 | 1/2009 | Kashio |
| 2009/0008673 A1 | 1/2009 | Kato et al. |
| 2013/0035455 A1 | 2/2013 | Kashio |
| 2013/0096253 A1 | 4/2013 | Tamada et al. |

FOREIGN PATENT DOCUMENTS

| CN | 102046700 A | | 5/2011 |
| JP | 56-97230 | * | 8/1981 |
| JP | 3-100033 | * | 4/1991 |
| JP | 2004-359933 A | | 12/2004 |
| JP | 2005-263869 A | | 9/2005 |
| JP | 2006-328231 A | | 12/2006 |
| JP | 2008-179811 A | | 8/2008 |
| JP | 2010-95689 | * | 4/2010 |
| WO | WO 2011/111667 A1 | | 9/2011 |
| WO | WO 2012/073988 A1 | | 6/2012 |

OTHER PUBLICATIONS

"Synthesis of sub-200 nm Silsesquioxane Particles using a Modified Stöber Sol-gel Route" authored by Arkhireeva et al. and published in the Journal of Materials Chemistry (2003) 13, 31-22-3127.*

* cited by examiner

*Primary Examiner* — Marc Zimmer
(74) *Attorney, Agent, or Firm* — Birch, Stewart, Kolasch & Birch, LLP

(57) ABSTRACT

The present invention provides: a curable polysilsesquioxane compound comprising at least one structural unit represented by $R^1SiO_{3/2}$ (wherein $R^1$ is a substituted or unsubstituted alkyl group having 1 to 10 carbon atoms, or a substituted or unsubstituted aryl group), a $^{29}Si$ nuclear magnetic resonance spectrum of the curable polysilsesquioxane compound having a first peak top within a range of −65 ppm or more and less than −55 ppm, having a second peak top within a range of −73 ppm or more and less than −65 ppm, and having a third peak top within a range of −82 ppm or more and less than −73 ppm, and the ratio of an integral value (P1) of a first peak to the total of the integral value (P1) of the first peak, an integral value (P2) of a second peak, and an integral value (P3) of a third peak being more than 0% and less than 10%; a method for producing the same; a curable composition; a cured product; and a method for using curable composition or the like as an optical device-securing material. According to the present invention, there can be provided: a curable compound that produce a cured product that exhibits excellent heat resistance, and exhibits high adhesion even at a high temperature; a method for producing a curable compound; a cured product obtained by curing the curable composition; and a method for using the curable compound or the curable composition.

20 Claims, 1 Drawing Sheet

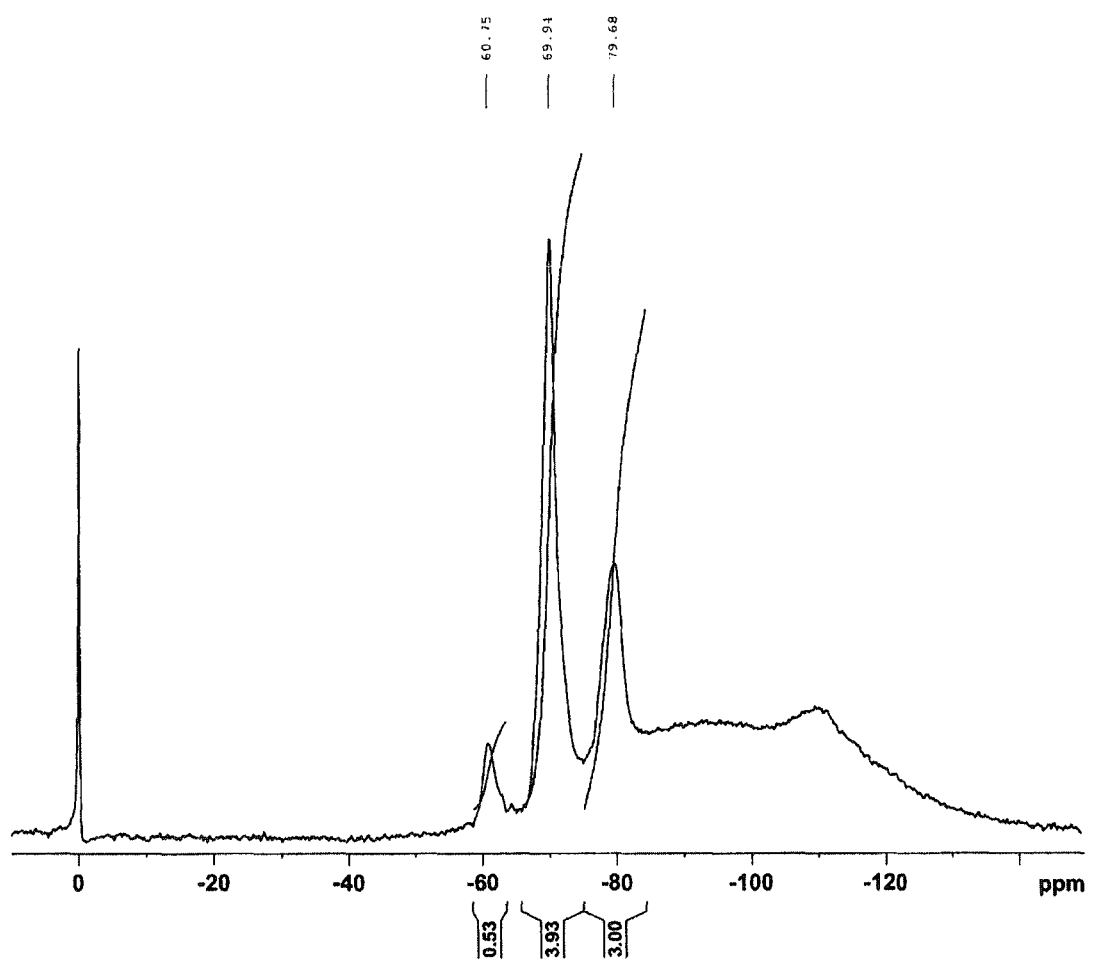

CURABLE POLYSILSESQUIOXANE COMPOUND, METHOD FOR PRODUCING SAME, CURABLE COMPOSITION, CURED PRODUCT, AND METHOD FOR USING CURABLE COMPOSITION OR THE LIKE

TECHNICAL FIELD

The present invention relates to a curable polysilsesquioxane compound that produces a cured product that exhibits excellent heat resistance and high adhesion, a method for producing the same, a curable composition, a cured product obtained by curing the curable composition, and a method for using the curable polysilsesquioxane compound or the the curable composition as an optical device-securing material.

BACKGROUND ART

In recent years, a curable composition has been used as an optical device-securing material composition such as an optical device adhesive and an optical device sealing material.

Examples of the optical device include a light-emitting device (e.g., laser (e.g., semiconductor laser diode (LD)) and light-emitting diode (LED)), a light-receiving device, a hybrid optical device, an optical integrated circuit, and the like. In recent years, an optical device that emits blue light or white light having a shorter emission peak wavelength has been developed, and widely used. The amount of heat generated by such an optical device tends to increase along with a significant increase in luminance of a light-emitting device that emits light having a short emission peak wavelength.

However, along with an increase in luminance of an optical device, the cured product of the optical device-securing material composition may be exposed to light having higher energy, or subjected to heat at a higher temperature generated by an optical device for a long time, and deteriorate (e.g., delamination (separation) may occur).

In order to solve this problem, Patent Documents 1 to 3 propose an optical device-securing material composition that includes a polysilsesquioxane compound as the main component.

A polysilsesquioxane compound is an intermediate substance between inorganic silica ($SiO_2$) and an organic silicone (($R_2SiO)_n$), and is represented by $(RSiO_{3/2})_n$ (wherein R is a substituted or unsubstituted alkyl group, a substituted or unsubstituted aryl group, or the like).

However, the optical device-securing material compositions disclosed in Patent Documents 1 to 3 that include a polysilsesquioxane compound as the main component may not produce a cured product that exhibits sufficient heat resistance and transparency while maintaining sufficient adhesion.

Therefore, development of a curable composition that produces a cured product that exhibits excellent heat resistance and high adhesion has been desired.

Patent Document 4 discloses a semiconductor light-emitting device member wherein (1) the solid Si-nuclear magnetic resonance spectrum of the semiconductor light-emitting device member includes at least one peak selected from the group consisting of (i) peaks whose peak top position is in an area of a chemical shift of −40 ppm or more and 0 ppm or less, and whose full width at half maximum is within a specific range, and (ii) peaks whose peak top position is in an area of a chemical shift of −80 ppm or more and less than −40 ppm, and whose full width at half maximum is within a specific range, (2) the semiconductor light-emitting device member has a silicon content of 20 wt % or more, and (3) the semiconductor light-emitting device member has a silanol content of 0.1 to 10 wt %.

RELATED-ART DOCUMENT

Patent Document

Patent Document 1: JP-A-2004-359933
Patent Document 2: JP-A-2005-263869
Patent Document 3: JP-A-2006-328231
Patent Document 4: JP-A-2007-112975 (US2009/008673A1)

SUMMARY OF THE INVENTION

Technical Problem

The invention was conceived in view of the above situation. An object of the invention is to provide a curable compound and a curable composition that produce a cured product that exhibits excellent heat resistance, and exhibits high adhesion even at a high temperature, a method for producing a curable compound, a cured product obtained by curing the curable composition, and a method for using the curable compound or the curable composition.

Solution to Problem

The inventors of the invention conducted extensive studies relating to a curable polysilsesquioxane compound obtained by subjecting a trialkoxysilane compound to polycondensation in the presence of a polycondensation catalyst in order to solve the above problem. As a result, the inventors found that a cured product that exhibits high adhesion even at a high temperature while maintaining excellent heat resistance for a long time is obtained using a curable polysilsesquioxane compound that is obtained by subjecting a trialkoxysilane compound to polycondensation in the presence of a polycondensation catalyst, the $^{29}Si$ nuclear magnetic resonance spectrum of the curable polysilsesquioxane compound having a first peak top, a second peak top, and a third peak top in specific ranges within the range of −82 ppm or more and less than −55 ppm, and the ratio of an integral value (P1) of a first peak to the total of the integral value (P1) of the first peak, an integral value (P2) of a second peak, and an integral value (P3) of a third peak being within a specific range. This finding has led to the completion of the invention.

Several aspects of the invention provide the following curable polysilsesquioxane compound (see (1) to (5)), method for producing a curable polysilsesquioxane compound (see (6)), curable composition (see (7)), cured product (see (8)), and method for using a curable polysilsesquioxane compound or a curable composition as an optical device-securing material (see (9)).

(1) A curable polysilsesquioxane compound including at least one structural unit represented by $R^1SiO_{3/2}$ (wherein $R^1$ is a substituted or unsubstituted alkyl group having 1 to 10 carbon atoms, or a substituted or unsubstituted aryl group), a $^{29}Si$ nuclear magnetic resonance spectrum of the curable polysilsesquioxane compound having a first peak top within the range of −65 ppm or more and less than −55 ppm, having a second peak top within the range of −73 ppm or more and less than −65 ppm, and having a third peak top within the range of −82 ppm or more and less than −73 ppm, and the ratio of an integral value (P1) of a first peak to the total of the integral value (P1) of the first peak, an integral value (P2) of a second peak, and an integral value (P3) of a third peak being more than 0% and less than 10%.

(2) The curable polysilsesquioxane compound according to (1), wherein the ratio of the integral value (P3) of the third peak to the total of the integral value (P1) of the first peak, the integral value (P2) of the second peak, and the integral value (P3) of the third peak is 20% or more.

(3) The curable polysilsesquioxane compound according to (1) or (2), having a weight average molecular weight of 500 to 5000.

(4) The curable polysilsesquioxane compound according to any one of (1) to (3), the curable polysilsesquioxane compound being a compound obtained by subjecting at least one alkoxysilane compound represented by $R^1Si(OR^2)_3$ (wherein $R^1$ is a substituted or unsubstituted alkyl group having 1 to 10 carbon atoms, or a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

(5) The curable polysilsesquioxane compound according to (4), wherein the polycondensation catalyst is at least one compound selected from boric acid, citric acid, acetic acid, sulfuric acid, and methanesulfonic acid.

(6) A method for producing the curable polysilsesquioxane compound according to any one of (1) to (5), the method including subjecting at least one compound represented by $R^1Si(OR^2)_3$ (wherein $R^1$ is a substituted or unsubstituted alkyl group having 1 to 10 carbon atoms, or a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

(7) A curable composition including the curable polysilsesquioxane compound according to any one of (1) to (5), and a silane coupling agent.

(8) A cured product obtained by heating the curable composition according to (7).

(9) A method for using the curable polysilsesquioxane compound according to any one of (1) to (5), or the curable composition according to (7), as an optical device-securing material.

Advantageous Effects of the Invention

The curable polysilsesquioxane compound according to one aspect of the invention, and the curable composition according to one aspect of the invention that includes at least the curable polysilsesquioxane compound and a silane coupling agent can produce a cured product that exhibits high adhesion even when exposed to high-energy light, or subjected to a high temperature.

The cured product according to one aspect of the invention exhibits high adhesion, and can sufficiently seal an optical device for a long time.

The curable polysilsesquioxane compound according to one aspect of the invention and the curable composition according to one aspect of the invention may be used as an optical device-securing material. In particular, the curable polysilsesquioxane compound according to one aspect of the invention and the curable composition according to one aspect of the invention may suitably be used as an optical device adhesive and an optical device sealing material.

BRIEF DESCRIPTION OF DRAWING

FIG. 1 is the $^{29}$Si-NMR spectrum chart of the curable polysilsesquioxane compound of Example 1.

DESCRIPTION OF EMBODIMENTS

A curable polysilsesquioxane compound, a method for producing a curable polysilsesquioxane compound, a curable composition, a cured product, and a method for using the curable polysilsesquioxane compound or the curable composition as an optical device-securing material according to exemplary embodiments of the invention are described in detail below.

1) Curable Polysilsesquioxane Compound

A curable polysilsesquioxane compound according to one embodiment of the invention includes at least one structural unit represented by $R^1SiO_{3/2}$ (wherein $R^1$ is a substituted or unsubstituted alkyl group having 1 to 10 carbon atoms, or a substituted or unsubstituted aryl group), a $^{29}$Si nuclear magnetic resonance spectrum of the curable polysilsesquioxane compound having a first peak top within the range of −65 ppm or more and less than −55 ppm, having a second peak top within the range of −73 ppm or more and less than −65 ppm, and having a third peak top within the range of −82 ppm or more and less than −73 ppm, and the ratio of an integral value (P1) of a first peak to the total of the integral value (P1) of the first peak, an integral value (P2) of a second peak, and an integral value (P3) of a third peak being more than 0% and less than 10%.

It is preferable that the ratio of the integral value (P1) to the total of the integral value (P1), the integral value (P2), and the integral value (P3) be 1.0 to 7.5%, since the advantageous effects of the invention can be further improved.

It is preferable that the ratio of the integral value (P3) to the total of the integral value (P1), the integral value (P2), and the integral value (P3) be 20% or more, more preferably 25 to 90%, and particularly preferably 30 to 70%, since the advantageous effects of the invention can be further improved.

A polysilsesquioxane compound is a silicon-based polymer that is obtained by subjecting a trifunctional organosilane compound to polycondensation, and tends to exhibit inorganic properties due to the siloxane (Si—O—Si) bond included in the main chain, and organic properties due to the organic group ($R^1$) included in the side chain.

The structure of the curable polysilsesquioxane compound according to one embodiment of the invention is not particularly limited. Examples of the structure of the curable polysilsesquioxane compound according to one embodiment of the invention include a ladder structure, a double decker structure, a basket structure, a partially cleaved basket structure, a cyclic structure, and a random structure.

The curable polysilsesquioxane compound according to one embodiment of the invention is a polymer that includes at least one structural unit represented by $R^1SiO_{3/2}$ (wherein $R^1$ is a substituted or unsubstituted alkyl group having 1 to 10 carbon atoms, or a substituted or unsubstituted aryl group).

The structural unit represented by $R^1SiO_{3/2}$ included in the curable polysilsesquioxane compound according to one embodiment of the invention is normally referred to as "T-site", and has a structure in which three oxygen atoms and one atom other than an oxygen atom are bonded to the silicon atom.

Specific examples of the structure of the T-site include structures respectively represented by the following formulas (a) to (c). Note that $R^2$ is/are a hydrogen atom or an alkyl group having 1 to 10 carbon atoms, provided that a plurality of $R^2$ are either identical or different, and * is a silicon (Si) atom (i.e., a position bonded to a silicon (Si) atom).

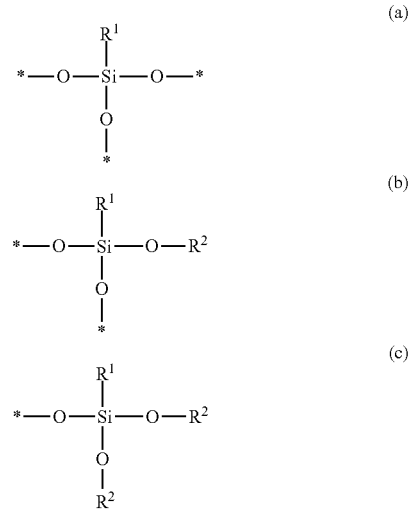

The curable polysilsesquioxane compound according to one embodiment of the invention is normally soluble in various organic solvents such as a halogen-based solvent such as chloroform, a ketone-based solvent such as acetone, an aromatic hydrocarbon-based solvent such as benzene, a sulfur-containing solvent such as dimethyl sulfoxide, an ether-based solvent such as tetrahydrofuran, an ester-based solvent such as ethyl acetate, and a mixed solvent of two or more solvents among these solvents. It is preferable that the curable polysilsesquioxane compound according to one embodiment of the invention have a solubility in chloroform at 20° C. of 1 mg/100 ml or more, more preferably 20 mg/100 ml or more, and particularly preferably 40 mg/100 ml or more.

Since the curable polysilsesquioxane compound according to one embodiment of the invention is normally soluble in various organic solvents, the curable polysilsesquioxane compound can be subjected to $^{29}$Si-NMR measurement in a solution state (dissolved state).

When the curable polysilsesquioxane compound according to one embodiment of the invention is subjected to $^{29}$Si-NMR measurement, peaks T0 to T3 attributed to the T-site are normally observed at −85 ppm to −55 ppm.

It is considered that the peak T0 is attributed to a silicon atom that does not form a siloxane bond, the peak T1 is attributed to a silicon atom that forms one siloxane bond (i.e., the silicon atom included in the structure represented by the formula (c)), the peak T2 is attributed to a silicon atom that forms two siloxane bonds (i.e., the silicon atom included in the structure represented by the formula (b)), and the peak T3 is attributed to a silicon atom that forms three siloxane bonds (i.e., the silicon atom included in the structure represented by the formula (a)).

In the curable polysilsesquioxane compound according to one embodiment of the invention, it is considered that the first peak having a peak top within the range of −65 ppm or more and less than −55 ppm corresponds to the peak T1, the second peak having a peak top within the range of −73 ppm or more and less than −65 ppm corresponds to the peak T2, and the third peak having a peak top within the range of −82 ppm or more and less than −73 ppm corresponds to the peak T3.

It is conjectured that the curable polysilsesquioxane compound can produce a cured product that exhibits high adhesion even at a high temperature while maintaining excellent heat resistance for a long time for the following reasons when the $^{29}$Si-NMR spectrum of the curable polysilsesquioxane compound has the first peak top within the range of −65 ppm or more and less than −55 ppm, has the second peak top within the range of −73 ppm or more and less than −65 ppm, and has the third peak top within the range of −82 ppm or more and less than −73 ppm, and the ratio of the integral value (P1) to the total of the integral value (P1), the integral value (P2), and the integral value (P3) is less than 10%.

Specifically, when the ratio of the integral value (P1) to the total of the integral value (P1), the integral value (P2), and the integral value (P3) is 10% or more, the curable polysilsesquioxane compound has a structure in which a number of components are eliminated due to dehydration or dealcoholization condensation when the curable polysilsesquioxane compound is cured by heating, and voids occur due to the eliminated components, whereby adhesion decreases. On the other hand, when the ratio of the integral value (P1) to the total of the integral value (P1), the integral value (P2), and the integral value (P3) is less than 10%, and the ratio of the integral value (P3) to the total of the integral value (P1), the integral value (P2), and the integral value (P3) is 20% or more, the curable polysilsesquioxane compound produces a cured product that has a relatively dense structure, and exhibits sufficient adhesion.

The $^{29}$Si-NMR spectrum may be measured as described below, for example.

Sample Conditions

Deuterated chloroform is used as a measurement solvent, and Fe(acac)$_3$ is used as a relaxation reagent in order to reduce the relaxation time.

The intensity of each peak is normalized using the area of tetramethylsilane (internal standard) (=1) to remove the effects of an error during each measurement.

Device Conditions

An NMR measurement device (e.g., "AV-500" manufactured by Bruker BioSpin K.K.) is used.

$^{29}$Si resonant frequency: 99.352 MHz
Probe: 5 mm (diameter) solution probe
Measurement temperature: 25° C.
Sample rotational speed: 20 kHz
Measurement method: inverse gated decoupling method
$^{29}$Si flip angle: 90°
$^{29}$Si 90° pulse width: 8.0 μs
Repetition time: 5 s
Integration count: 9200
Observation width: 30 kHz Waveform Analysis The chemical shift of each peak of the spectrum subjected to a Fourier transform is calculated from the position of the peak top, and integrated.

The curable polysilsesquioxane compound that includes at least one structural unit represented by $R^1SiO_{3/2}$ may be obtained by subjecting at least one silane compound represented by the formula (1): $R^1Si(OR^2)_3$ (hereinafter may be referred to as "silane compound (1)") to polycondensation in the presence of a polycondensation catalyst.

$R^1$ in the formula (1) is a substituted or unsubstituted alkyl group having 1 to 10 carbon atoms, or a substituted or unsubstituted aryl group.

Examples of the alkyl group having 1 to 10 carbon atoms (that is substituted or unsubstituted) include a methyl group, an ethyl group, an n-propyl group, an isopropyl group, an n-butyl group, a t-butyl group, an isobutyl group, an s-butyl group, an n-pentyl group, an n-hexyl group, an n-octyl group, an n-decyl group, and the like.

Examples of a substituent that may substitute the alkyl group having 1 to 10 carbon atoms include a cyano group; a halogen atom such as a fluorine atom and a chlorine atom; an alkoxy group having 1 to 6 carbon atoms, such as a methoxy group and an ethoxy group; an alkylthio group having 1 to 6 carbon atoms, such as a methylthio group and an ethylthio group; an alkoxycarbonyl group having 1 to 6 carbon atoms, such as a methoxycarbonyl group and an ethoxycarbonyl group; a mercapto group; an acryloyloxy group; a methacryloyloxy group; an aryl group such as a phenyl group; an amino group; a group represented by OG (wherein G is an acyl group), such as an acetoxy group, a propionyloxy group, and a benzoyloxy group; and the like.

Examples of the aryl group (that is substituted or unsubstituted) include a phenyl group, a 1-naphthyl group, a 2-naphthyl group, an anthracenyl group, and the like.

Examples of a substituent that may substitute the aryl group include an alkyl group having 1 to 6 carbon atoms, such as a methyl group, an ethyl group, an n-propyl group, an isopropyl group, an n-butyl group, an s-butyl group, an isobutyl group, and a t-butyl group; an alkoxy group having 1 to 6 carbon atoms, such as a methoxy group, an ethoxy group, and an isopropoxy group; a halogen atom such as a fluorine atom and a chlorine atom; and the like.

$R^2$ are a hydrogen atom or an alkyl group having 1 to 10 carbon atoms, and preferably an alkyl group having 1 to 6 carbon atoms. Examples of the alkyl group having 1 to 10 carbon atoms represented by $R^2$ include those mentioned above in connection with $R^1$. $R^2$ are either identical or different. All of $R^2$ may be identical.

Specific examples of the silane compound represented by the formula (1) include a substituted or unsubstituted alkyltrialkoxysilane compound such as methyltrimethoxysilane, methyltriethoxysilane, ethyltrimethoxysilane, ethyltriethoxysilane, n-propyltrimethoxysilane, n-butyltriethoxysilane, isobutyltrimethoxysilane, n-pentyltriethoxysilane, n-hexyltrimethoxysilane, isooctyltriethoxysilane, decyltrimethoxysilane, methyldimethoxyethoxysilane, methyldiethoxymethoxysilane, cyanomethyltriethoxysilane, 2-cyanoethyltriethoxysilane, 2-cyanoethyltrimethoxysilane, 2-chloroethyltriethoxysilane, methoxymethyltriethoxysilane, methylthiomethyltriethoxysilane, methoxycarbonylmethyltriethoxysilane, 2-acryloyloxyethyltrimethoxysilane, and 3-methacryloyloxypropyltriethoxysilane; substituted or unsubstituted aryltrialkoxysilane compound such as phenyltrimethoxysilane, 4-methoxyphenyltrimethoxysilane, 2-chlorophenyltrimethoxysilane, phenyltriethoxysilane, 2-methoxyphenyltriethoxysilane, phenyldimethoxyethoxysilane, and phenyldiethoxymethoxysilane; and the like.

These silane compounds may be used either alone or in combination. It is preferable to use two or more silane compounds from the viewpoint of adjusting heat resistance and discoloration resistance.

The silane compound (1) (one type or two or more types of the silane compound (1)) is polymerized in the presence of a polycondensation catalyst in an appropriate solvent that is selected taking account of the type of the silane compound (1) and the type of the polycondensation catalyst under relatively mild reaction conditions to obtain a curable polysilsesquioxane compound characterized in that the $^{29}Si$ nuclear magnetic resonance spectrum of the curable polysilsesquioxane compound has the first peak top within the range of −65 ppm or more and less than −55 ppm, has the second peak top within the range of −73 ppm or more and less than −65 ppm, and has the third peak top within the range of −82 ppm or more and less than −73 ppm, and the ratio of the integral value (P1) to the total of the integral value (P1), the integral value (P2), and the integral value (P3) is less than 10%.

The polycondensation catalyst is not particularly limited as long as the above curable polysilsesquioxane compound can be obtained. It is preferable to use an acid catalyst since the above curable polysilsesquioxane compound can be easily obtained. Examples of the acid catalyst include an inorganic acid such as hydrochloric acid, sulfuric acid, nitric acid, phosphoric acid, and boric acid; an organic acid such as methanesulfonic acid, trifluoromethanesulfonic acid, benzenesulfonic acid, p-toluenesulfonic acid, acetic acid, trifluoroacetic acid, and citric acid; and the like.

It is preferable to use at least one acid catalyst selected from boric acid, citric acid, acetic acid, sulfuric acid, and methanesulfonic acid, since the target product can be easily obtained. It is particularly preferable to use at least one acid catalyst selected from citric acid, acetic acid, and methanesulfonic acid, since the reaction can be effected under mild conditions.

The polycondensation catalyst is used an appropriate amount taking account of the type of the silane compound (1), the type of the polycondensation catalyst, and the like. The polycondensation catalyst is normally used in a ratio of 0.05 to 30 mol %, preferably 0.2 to 20 mol %, and more preferably 0.3 to 15 mol %, based on the total number of moles of the silane compound (1).

The solvent may be appropriately selected taking account of the type and the amount of the silane compound (1), the type and the amount of the polycondensation catalyst, and the like. Examples of the solvent include water; an aromatic hydrocarbon such as benzene, toluene, and xylene; an ester such as methyl acetate, ethyl acetate, propyl acetate, and methyl propionate; a ketone such as acetone, methyl ethyl ketone, methyl isobutyl ketone, and cyclohexanone; an alcohol such as methyl alcohol, ethyl alcohol, n-propyl alcohol, isopropyl alcohol, n-butyl alcohol, isobutyl alcohol, s-butyl alcohol, and t-butyl alcohol; and the like. These solvents may be used either alone or in combination.

It is preferable to use water or an alcohol, and more preferably water, since the target product can be easily obtained.

The solvent is normally used in an amount of 1 to 1000 ml, preferably 10 to 500 ml, and more preferably 50 to 200 ml, based on 1 mol of the silane compound (1).

The reaction temperature and the reaction time employed when subjecting the silane compound (1) to polycondensation (reaction) are appropriately selected taking account of the type of the silane compound (1), the type of the polycondensation catalyst, the type of the solvent, and the like.

The reaction temperature is normally in the range from 0° C. to the boiling point of the solvent, and preferably 20 to 100° C. If the reaction temperature is too low, condensation (condensation reaction) may not proceed sufficiently. If the reaction temperature is too high, it may be difficult to suppress gelation.

The reaction time is normally 30 minutes to 10 hours.

When using a strong acid having an acid dissociation constant (pKa) of less than 2.5 (e.g., hydrochloric acid, sulfuric acid, or phosphoric) as the acid catalyst, a curable polysilsesquioxane compound having the desired properties can be easily obtained by setting the reaction temperature to 5 to 35° C., and increasing the reaction time (14 to 72 hours). When using a relatively weak acid having an acid dissociation constant (pKa) of 2.5 or more, a curable polysilsesquioxane compound having the desired properties can be easily obtained by setting the reaction temperature to 40 to 100° C., and decreasing the reaction time (1 to 12 hours).

The acid dissociation constant (pKa) is expressed by $-\log_{10}$ pKa provided that an acid is represented by HA, a solvent is represented by Hsolv, and the equilibrium constant Ka is represented by the following formula.

$$HA + Hsolv \rightleftharpoons H_2solv^+ + A^-$$

$$Ka = \frac{[H_2solv^+][A^-]}{[HA]}$$

Note that [$H_2solv^+$], [$A^-$], and [HA] are the concentration (mol·dm$^{-3}$) of $H_2solv^+$, the concentration (mol·dm$^{-3}$) of $A^-$, and the concentration (mol·dm$^{-3}$) of HA, respectively.

The acid dissociation constant may be calculated by titrating a solution (e.g., aqueous solution) of the acid using a standard alkali solution, and analyzing the titration curve. An acid that undergoes multistep ionization (e.g., boric acid, citric acid, and phosphoric acid) has a dissociation constant corresponding to each step. Note that the term "acid dissociation constant" used herein refers to the acid dissociation constant (pKa1) corresponding to the first step.

Specific examples of a strong acid having an acid dissociation constant (pKa) in water (25° C.) of less than 2.5 include sulfuric acid, phosphoric acid, methanesulfonic acid, trichloroacetic acid, trifluoroacetic acid, hydrochloric acid, nitric acid, and the like. Specific examples of a weak acid having an acid dissociation constant (pKa) in water (25° C.) of 2.5 or more include boric acid, citric acid, acetic acid, formic acid, and the like. The acid dissociation constant (pKa) of each acid is described in "Kagaku Binran (Handbook of Chemistry)", 4th Edition, Maruzen Co., Ltd., for example.

For example, when using phenyltriethoxysilane (170 mmol) and 2-cyanoethyltriethoxysilane (30 mmol) as the silane compound (1), citric acid is used as the catalyst in a ratio of 10 mol % based on the silane compound (1), and water is used as the solvent. The components are reacted at 25 to 75° C. for 1.5 to 5.5 hours to obtain a curable polysilsesquioxane compound having the desired $^{29}$Si-NMR spectrum pattern.

Note that the expression "curable" used herein means that curing can be effected using heat in an arbitrary manner.

As described above, the curable polysilsesquioxane compound characterized in that the ratio of the integral value (P1) to the total of the integral value (P1), the integral value (P2), and the integral value (P3) is less than 10%, can be obtained by semi-empirically setting appropriate reaction conditions taking account of the type of the silane compound (1), the type of the catalyst, and the like.

A cured product that exhibits excellent adhesion can be obtained by utilizing the curable polysilsesquioxane compound according to one embodiment of the invention independently of the type of the silane compound (1), the type of the catalyst, and the like.

After completion of the reaction, a post-treatment operation normally used for organic synthesis may be performed. For example, an organic solvent such as ethyl acetate is added to the reaction mixture, and the mixture is washed with purified water. The organic layer is concentrated, and dried to obtain the target curable polysilsesquioxane compound.

The weight average molecular weight (Mw) of the curable polysilsesquioxane compound according to one embodiment of the invention is preferably 500 to 5000, and more preferably 500 to 2000.

The weight average molecular weight (Mw) of the curable polysilsesquioxane compound according to one embodiment of the invention may be determined as a standard polystyrene-equivalent value by gel permeation chromatography (GPC) using tetrahydrofuran (THF) as a solvent, for example.

The molecular weight distribution (Mw/Mn) of the curable polysilsesquioxane compound according to one embodiment of the invention is not particularly limited, but is normally 1.0 to 3.0, and preferably 1.1 to 1.4. When the molecular weight distribution (Mw/Mn) is within the above range, a cured product that exhibits improved adhesion can be obtained.

2) Method for Producing Curable Polysilsesquioxane Compound

A method for producing a curable polysilsesquioxane compound according to one embodiment of the invention includes subjecting at least one compound represented by $R^1Si(OR^2)_3$ to polycondensation in the presence of a polycondensation catalyst to produce the curable polysilsesquioxane compound according to one embodiment of the invention.

Note that $R^1$ and $R^2$ are the same as defined above.

Examples of the polycondensation catalyst, the polycondensation conditions (reaction conditions), and the like include those mentioned above.

The method for producing a curable polysilsesquioxane compound according to one embodiment of the invention can produce the curable polysilsesquioxane compound according to one embodiment of the invention in high yield so that the $^{29}$Si nuclear magnetic resonance spectrum of the curable polysilsesquioxane compound has the first peak top within the range of $-65$ ppm or more and less than $-55$ ppm, has the second peak top within the range of $-73$ ppm or more and less than $-65$ ppm, and has the third peak top within the range of $-82$ ppm or more and less than $-73$ ppm, and the ratio of the integral value (P1) of the first peak to the total of the integral value (P1) of the first peak, the integral value (P2) of the second peak, and the integral value (P3) of the third peak is less than 10%.

3) Curable Composition

A curable composition according to one embodiment of the invention includes the curable polysilsesquioxane compound according to one embodiment of the invention, and a silane coupling agent. The content of the curable polysilsesquioxane compound according to one embodiment of the invention in the curable composition according to one embodiment of the invention is preferably 60 to 99.7 wt %, more preferably 70 to 95 wt %, and still more preferably 80 to 90 wt %. When the content of the curable polysilsesquioxane compound according to one embodiment of the invention in the curable composition is within the above range, the curable composition can produce a cured product that exhibits high adhesion even at a high temperature while maintaining excellent heat resistance for a long time.

The curable composition according to one embodiment of the invention includes the silane coupling agent in addition to the curable polysilsesquioxane compound according to one embodiment of the invention. The silane coupling agent ensures that the curable composition according to one embodiment of the invention can produce a cured product that exhibits high adhesion even at a high temperature while maintaining excellent heat resistance for a long time.

The silane coupling agent is not particularly limited. Examples of the silane coupling agent include a silane compound that includes a vinyl group, such as vinyltrimethoxysilane, vinyltriethoxysilane, vinyltrichlorosilane, p-styryltrimethoxysilane, and vinyltriacetoxysilane; a silane compound that includes a halogen, such as γ-chloropropyltrimethoxysilane, chloromethyltrimethoxysilane, and chloromethylphenethyltrimethoxysilane; a silane compound that includes a (meth)acryloxy group, such as γ-methacryloxypropyltrimethoxysilane, γ-methacryloxypropylmethyldimethoxysilane, and 3-acryloxyprophyltrimethoxysilane; a silane compound that includes a mercapto group, such as γ-mercaptopropyltrimethoxysilane; a silane compound that includes a ureido group, such as 3-ureidopropyltriethoxysilane; a silane compound that includes an isocyanate group, such as 3-isocyanatopropyltriethoxysilane;

a silane compound that includes an amino group, such as N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane, and γ-anilinopropyltrimethoxysilane;

a silane compound that includes an epoxy group, such as 2-(3,4-epoxycyclohexyl)ethyltrimethoxysilane, 2-(3,4-epoxycyclohexyl)ethyltriethoxysilane, 3-glycidoxypropyltrimethoxysilane, 3-glycidoxypropyltriethoxysilane, 3-glycidoxypropylmethyldimethoxysilane, 3-glycidoxypropylmethyldiethoxysilane, (oxetan-3-yl)methyltrimethoxysilane, (oxetan-3-yl)methyltriethoxysilane, (oxetan-3-yl)methyl methyl dimethoxysilane, (oxetan-3-yl)methylethyldimethoxysilane, (oxetan-3-yl)methylethyldiethoxysilane, (oxetan-3-yl)methylphenyldiethoxysilane, and 2-(oxetan-3'-yl)ethyltrimethoxysilane;

a silane coupling agent having an acid anhydride structure, such as 2-trimethoxysilylethylsuccinic anhydride and 3-triethoxysilylpropylsuccinic anhydride; bis(triethoxysilylpropyl)tetrasulfide; octadecyldimethyl(3-(trimethoxysilyl)propyl)ammonium chloride; and the like.

These silane coupling agents may be used either alone or in combination.

It is preferable to use a silane compound that includes an epoxy group, since a cured product that exhibits excellent heat resistance and excellent transparency, and exhibits improved adhesion can be obtained.

The silane coupling agent is preferably used so that the mass ratio of the curable polysilsesquioxane compound according to one embodiment of the invention to the silane coupling agent (curable polysilsesquioxane compound:silane coupling agent) is 100:0.3 to 100:30, and more preferably 100:1 to 100:20.

When the silane coupling agent is used in a ratio within the above range, it is possible to obtain a curable composition that can produce a cured product that exhibits improved transparency, improved adhesion, and improved heat resistance, and rarely shows a deterioration in adhesion even when subjected to a high temperature.

The curable composition according to one embodiment of the invention may further include an additional component as long as the object of the invention is not impaired.

Examples of the additional component include an antioxidant, a UV absorber, a light stabilizer, a diluent, and the like.

The antioxidant is added to the curable composition in order to prevent a deterioration due to oxidation during heating. Examples of the antioxidant include a phosphorus-based antioxidant, a phenol-based antioxidant, a sulfur-based antioxidant, and the like.

Examples of the phosphorus-based antioxidants include a phosphite, an oxaphosphaphenanthrene oxide, and the like.

Examples of the phenol-based antioxidant include a monophenol, a bisphenol, a polyphenol, and the like.

Examples of the sulfur-based antioxidant include dilauryl 3,3'-thiodipropionate, dimyristyl 3,3'-thiodipropionate, distearyl 3,3'-thiodipropionate, and the like.

These antioxidants may be used either alone or in combination. The antioxidant is normally used in a ratio of 10 mass % or less based on the curable composition.

The UV absorber is added to the curable composition in order to improve the light resistance of the resulting cured product.

Examples of the UV absorber include a salicylic acid, a benzophenone, a benzotriazole, a hindered amine, and the like.

These UV absorbers may be used either alone or in combination.

The UV absorber is normally used in a ratio of 10 mass % or less based on the curable composition.

The light stabilizer is added to the curable composition in order to improve the light resistance of the resulting cured product.

Examples of the light stabilizer include a hindered amine such as poly[{6-(1,1,3,3-tetramethylbutyl)amino-1,3,5-triazine-2,4-diyl}{(2,2,6,6-tetramethyl-4-piperidine)imino}hexamethylene{(2,2,6,6-tetramethyl-4-piperidine)imino}], and the like.

These light stabilizers may be used either alone or in combination.

The light stabilizer is normally used in a ratio of 10 mass % or less based on the curable composition.

The diluent is added to the curable composition in order to adjust the viscosity of the curable composition.

Examples of the diluent include glycerol diglycidyl ether, butanediol diglycidyl ether, neopentyl glycol glycidyl ether, cyclohexanedimethanol diglycidyl ether, alkylene diglycidyl ether, polyglycol diglycidyl ether, polypropylene glycol diglycidyl ether, trimethylolpropane triglycidyl ether, glycerol triglycidyl ether, 4-vinylcyclohexene monooxide, vinylcyclohexene dioxide, methylated vinylcyclohexene dioxide, diglycidylaniline, and the like.

These diluents may be used either alone or in combination.

The curable composition according to one embodiment of the invention may be obtained by mixing the curable polysilsesquioxane compound according to one embodiment of the invention, the silane coupling agent, and an optional additional component in a given ratio, and defoaming the mixture using a known method, for example.

The curable composition according to one embodiment of the invention thus obtained can produce a cured product that exhibits high adhesion even when exposed to high-energy light, or subjected to a high temperature.

Therefore, the curable composition according to one embodiment of the invention may suitably be used as a raw material for producing an optical part or a formed article, an adhesive, a coating material, and the like. Since the curable composition according to one embodiment of the invention can prevent a deterioration in an optical device-securing material, the curable composition according to one embodiment of the invention may suitably be used as an optical device-securing material composition.

4) Cured Product

A cured product according to one embodiment of the invention is obtained by heating the curable composition according to one embodiment of the invention.

The heating temperature is normally 100 to 250° C., and preferably 150 to 200° C., and the heating time is normally 10 minutes to 15 hours, and preferably 30 minutes to 8 hours.

The cured product according to one embodiment of the invention exhibits high adhesion even when exposed to high-energy light, or subjected to a high temperature.

Since the cured product according to one embodiment of the invention can prevent a deterioration in an optical device-securing material due to an increase in luminance of an optical device, the cured product according to one embodiment of the invention may suitably be used as an optical device-securing material. For example, the cured product according to one embodiment of the invention may suitably be used as a raw material for producing an optical part or a formed article, an adhesive, a coating material, and the like.

A cured product obtained by curing the curable composition according to one embodiment of the invention exhibits high adhesion when measured using the following method, for example.

Specifically, the curable composition is applied to a mirror surface of a silicon chip. The surface of the silicon chip to which the curable composition is applied is placed on an adherend, and compression-bonded to the adherend, and the curable composition is cured by heating. After allowing the resulting product to stand for 30 seconds on the measurement stage of a bond tester that has been heated to a given temperature (e.g., 23 or 100° C.), adhesion between the specimen and the adherend is measured while applying stress to the bonding surface in the horizontal direction (shearing direction) at a height of 50 μm above the adherend.

The cured product preferably has an adhesion at 23° C. of 120 N/2 mm$^2$ or more, and an adhesion at 100° C. of 90 N/2 mm$^2$ or more.

5) Method for Using Curable Polysilsesquioxane Compound or Curable Composition as Optical Device-Securing Material A method for using a curable polysilsesquioxane compound or a curable composition as an optical device-securing material according to one embodiment of the invention includes using the curable polysilsesquioxane compound according to one embodiment of the invention or the curable composition according to one embodiment of the invention as an optical device-securing material.

Examples of the optical device-securing material include an optical device adhesive, a optical device sealing material, and the like.

Examples of the optical device include a light-emitting device such as an LED and a semiconductor laser (LD), a light-receiving device, a hybrid optical device, an optical integrated circuit, and the like.

Optical Device Adhesive

The curable polysilsesquioxane compound according to one embodiment of the invention or the curable composition according to one embodiment of the invention may suitably be used as an optical device adhesive.

When using the curable polysilsesquioxane compound according to one embodiment of the invention or the curable composition according to one embodiment of the invention as an optical device adhesive, the composition is applied to the bonding target surface of either or both of the adherends (e.g., an optical device and a substrate), the adherends are compression-bonded, and the composition is cured by heating to firmly bond the adherends, for example.

Examples of a material for forming a substrate to which the optical device is bonded, include glass such as soda lime glass and heat-resistant hard glass; a ceramic; a metal such as iron, copper, aluminum, gold, silver, platinum, chromium, titanium, an alloy thereof, and stainless steel (e.g., SUS302, SUS304, SUS304L, and SUS309); a synthetic resin such as polyethylene terephthalate, polybuthylene terephthalate, polyethylene naphthalate, an ethylene-vinyl acetate copolymer, polystyrene, polycarbonate, polymethylpentene, polysulfone, polyether ether ketone, polyether sulfone, polyphenylene sulfide, polyetherimide, polyimide, polyamide, an acrylic resin, a norbornene resin, a cycloolefin resin, and a glass epoxy resin; and the like.

The heating temperature is determined taking account of the type of the curable polysilsesquioxane compound or the curable composition, and the like, but is normally 100 to 250° C., and preferably 150 to 200° C. The heating time is normally 10 minutes to 15 hours, and preferably 30 minutes to 8 hours.

Optical Device Sealing Material

The curable polysilsesquioxane compound according to one embodiment of the invention or the curable composition according to one embodiment of the invention may suitably be used as an optical device sealing material.

When using the curable polysilsesquioxane compound according to one embodiment of the invention or the curable composition according to one embodiment of the invention as an optical device sealing material, the composition is formed (molded) into the desired shape to obtain a formed article in which an optical device is enclosed, and the formed article is cured by heating to produce a sealed optical device, for example.

The curable polysilsesquioxane compound according to one embodiment of the invention or the curable composition according to one embodiment of the invention may be formed into the desired shape using an arbitrary method. A known molding method such as a transfer molding method or a casting method may be used.

The heating temperature is determined taking account of the type of the curable polysilsesquioxane compound or the curable composition, and the like, but is normally 100 to 250° C., and preferably 150 to 200° C. The heating time is normally 10 minutes to 15 hours, and preferably 30 minutes to 8 hours.

Since the sealed optical device is produced using the curable polysilsesquioxane compound according to one embodiment of the invention or the curable composition according to one embodiment of the invention, the sealed optical device exhibits excellent adhesion.

EXAMPLES

The invention is further described below by way of examples and comparative examples. Note that the invention is not limited to the following examples.

$^{29}$Si-NMR measurement conditions
Device: AV-500 manufactured by Bruker BioSpin K.K.
$^{29}$Si-NMR resonant frequency: 99.352 MHz
Probe: 5 mm (diameter) solution probe
Measurement temperature: room temperature
Sample rotational speed: 20 kHz
Measurement method: inverse gated decoupling method
$^{29}$Si flip angle: 90°
$^{29}$Si 90° pulse width: 8.0 μs
Repetition time: 5 s
Integration count: 9200
Observation width: 30 kHz
Preparation of $^{29}$Si-NMR sample
  Fe(acac)$_3$ was added as a relaxation reagent in order to reduce the relaxation time.
Polysilsesquioxane concentration: 15%
Fe(acac)$_3$ concentration: 0.6%
Measurement solvent: CDCl$_3$
Internal standard: TMS
Measurement of Weight Average Molecular Weight
  The weight average molecular weight (Mw) (standard polystyrene-equivalent value) of the silane compound copolymer obtained in each production example was measured under the following conditions using the following device.
Device: HLC-8220 GPC manufactured by Tosoh Corporation
Column: TSKgel GMHXL, TSKgel GMHXL, and TSKgel 12000 HXL were
sequentially connected
Solvent: tetrahydrofuran
Injection amount: 80 μl
Measurement temperature: 40° C.
Flow rate: 1 ml/min
Detector: differential refractometer Example 1

A 300 ml recovery flask was charged with 40.87 g (170 mmol) of phenyltriethoxysilane (manufactured by Tokyo Chemical Industry Co., Ltd.) and 6.52 g (30 mmol) of 2-cyanoethyltriethoxysilane (manufactured by AZmax Co.). After the addition of an aqueous solution prepared by dissolving 1.24 g (20 mmol, 10 mol % based on the total amount of the silane compounds) of boric acid in 10.8 ml of distilled water with stirring, the mixture was stirred at 30° C. for 2 hours, and then stirred at 70° C. for 5 hours. After completion of the reaction, 100 g of ethyl acetate was added to the reaction mixture to effect separation, and the organic layer was collected. The organic layer was washed with purified water until the aqueous layer had a pH of 4, and concentrated using an evaporator. The concentrate was dried under vacuum to obtain 33.1 g of a curable polysilsesquioxane compound 1.

The curable polysilsesquioxane compound 1 had a weight average molecular weight (Mw) of 1044 and a molecular weight distribution (Mw/Mn) of 1.252.

The curable polysilsesquioxane compound 1 was subjected to $^{29}$Si-NMR spectrum measurement. Table 1 shows the ratio of the integral values of the peaks T1, T2, and T3.

FIG. 1 shows the $^{29}$Si-NMR spectrum chart.

Examples 2 to 5 and Comparative Examples 1 to 3

Curable polysilsesquioxane compounds 2 to 5 and 1r to 3r were respectively obtained in the same manner as in Example 1, except that the acid shown in Table 1 was used instead of 1.24 g of boric acid in the amount shown in Table 1.

Table 1 shows the ratio of the integral values P1, P2, and P3 of the peaks T1, T2, and T3.

Table 1 shows the yield (g), the weight average molecular weight (Mw), and the molecular weight distribution (Mw/Mn) of the curable polysilsesquioxane compounds 2 to 5 and 1r to 3r.

Examples 6 to 10 and Comparative Examples 4 to 6

1 g of 2-(3,4-epoxycyclohexyl)ethyltrimethoxysilane (manufactured by Shin-Etsu Chemical Co., Ltd.) (silane coupling agent) was added to 10 g of each of the curable polysilsesquioxane compounds 1 to 5 and 1r to 3r obtained in Examples 1 to 5 and Comparative Examples 1 to 3, and the mixture was sufficiently mixed and defoamed to obtain curable compositions 6 to 10 and 4r to 6r, respectively.

The curable compositions 6 to 10 and 4r to 6r were subjected to the adhesion test described below. The test results are shown in Table 1.
Adhesion Test 1

The curable composition (6 to 10 and 4r to 6r) was applied to a mirror surface of a silicon chip (2×2 mm) to a thickness of about 2 μm. The surface of the silicon chip to which the curable composition was applied was compression-bonded to an adherend (silver-plated copper sheet). The curable composition was cured by heating at 180° C. for 2 hours to prepare a specimen-bonded adherend. After allowing the specimen-bonded adherend to stand for 30 seconds on the measurement stage of a bond tester ("Series 4000" manufactured by Dage Co., Ltd.) that had been heated to a given temperature (23° C. or 100° C.), adhesion (N/mm$^2$) (23° C. and 100° C.) between the specimen and the adherend was measured while applying stress (speed: 200 μm/s) to the bonding surface in the horizontal direction (shearing direction) at a height of 50 μm above the adherend.

TABLE 1

| | Acid catalyst | | | | Curable polysilsesquioxane compound | | | | | | Adhesion (N/2 mm$^2$) | |
|---|---|---|---|---|---|---|---|---|---|---|---|---|
| | Type | Amount (g) | Ratio (mol %) | Yield (g) | No. | Mw | Mw/Mn | P1 | P2 | P3 | 23° C. | 100° C. |
| Example 1 | Boric acid | 1.24 | 10 | 33.1 | 1 | 1044 | 1.252 | 7.10 | 52.68 | 40.22 | 124.45 | 100.36 |
| Example 2 | Citric acid | 3.84 | 10 | 30.8 | 2 | 1534 | 1.375 | 6.16 | 42.47 | 51.37 | 145.96 | 105.95 |
| Example 3 | Acetic acid | 1.20 | 10 | 27.5 | 3 | 915 | 1.162 | 6.41 | 62.42 | 31.17 | 130.56 | 106.72 |
| Example 4 | Sulfuric acid | 0.088 | 0.45 | 29.6 | 4 | 1057 | 1.143 | 7.61 | 51.63 | 40.76 | 128.13 | 103.89 |
| Example 5 | Methanesulfonic acid | 1.92 | 10 | 31.2 | 5 | 1388 | 1.241 | 5.61 | 38.32 | 56.07 | 133.37 | 104.03 |

TABLE 1-continued

| | | Acid catalyst | | | | Curable polysilsesquioxane compound | | | | | Adhesion (N/2 mm²) | |
|---|---|---|---|---|---|---|---|---|---|---|---|---|
| | Type | Amount (g) | Ratio (mol %) | Yield (g) | No. | Mw | Mw/Mn | P1 | P2 | P3 | 23° C. | 100° C. |
| Comparative Example 1 | Phosphoric acid | 0.088 | 0.45 | 28.4 | 1r | 1470 | 1.480 | 10.60 | 52.86 | 36.54 | 84.55 | 45.68 |
| Comparative Example 2 | Formic acid | 0.92 | 10 | 30.3 | 2r | 1610 | 1.460 | 13.73 | 53.59 | 32.68 | 72.62 | 47.11 |
| Comparative Example 3 | Trifluoroacetic acid | 0.10 | 0.45 | 32.8 | 3r | 986 | 1.133 | 11.92 | 52.66 | 35.42 | 73.42 | 46.59 |

As shown in Table 1, the cured products of the curable compositions obtained using the curable polysilsesquioxane compounds of Examples 1 to 5 had an adhesion at 23° C. of 120 N/2 mm² or more (i.e., exhibited excellent adhesion). The cured products an adhesion at 100° C. of 100 N/2 mm² or more (i.e., also exhibited excellent heat resistance).

On the other hand, the cured products of the curable compositions obtained using the curable polysilsesquioxane compounds of Comparative Examples 1 to 3 had an adhesion at 23° C. of 85 N/2 mm² or less and an adhesion at 100° C. of 48 N/2 mm² or less (i.e., exhibited inferior adhesion and inferior heat resistance).

Comparative Example 7

An airtight container was charged with 12.7 g of methyltrimethoxysilane, 11.2 g of dimethyldimethoxysilane, 3.3 g of methanol, 8.1 g of water, and 4.8 g of a 5% methanol solution of acetylacetone aluminum salt (catalyst), and the mixture was mixed. After sealing the container, the mixture was heated for 8 hours in a hot water bath (50° C.) while stirring the mixture using a stirrer, and then allowed to cool to room temperature to obtain a hydrolysis-polycondensation mixture.

The mixture was concentrated using an evaporator, and the concentrate was dried under vacuum to obtain a polymer 7r.

The polymer 7r had a weight average molecular weight (Mw) of 415 and a molecular weight distribution (Mw/Mn) of 1.004.

The polymer 7r was insoluble in various organic solvents such as chloroform, DMSO, toluene, benzene, acetone, ethyl acetate, and methyl ethyl ketone.

Therefore, the $^{29}$Si-NMR spectrum of the polymer 7r could not be measured in a solution state.

1 g of 2-(3,4-epoxycyclohexyl)ethyltrimethoxysilane (manufactured by Shin-Etsu Chemical Co., Ltd.) (silane coupling agent) was added to 10 g of the polymer 7r obtained in Comparative Example 7, and the mixture was sufficiently mixed and defoamed to obtain a composition 7r.

Adhesion test 2

The composition 7r was applied to a mirror surface of a silicon chip (2×2 mm) to a thickness of about 2 μm. The surface of the silicon chip to which the curable composition was applied was compression-bonded to an adherend (silver-plated copper sheet). The composition was heated at 180° C. for 2 hours. However, the silicon chip was not bonded to the silver-plated copper sheet, and fell from the silver-plated copper sheet.

The invention claimed is:

1. A curable polysilsesquioxane compound comprising at least one structural unit represented by $R^1SiO_{3/2}$ (wherein $R^1$ is a substituted or unsubstituted aryl group), a $^{29}$Si nuclear magnetic resonance spectrum of the curable polysilsesquioxane compound having a first peak top within a range of −65 ppm or more and less than −55 ppm, having a second peak top within a range of −73 ppm or more and less than −65 ppm, and having a third peak top within a range of −82 ppm or more and less than −73 ppm, and the ratio of an integral value (P1) of a first peak to the total of the integral value (P1) of the first peak, an integral value (P2) of a second peak, and an integral value (P3) of a third peak being more than 0% and less than 10%.

2. The curable polysilsesquioxane compound according to claim 1, wherein the ratio of the integral value (P3) of the third peak to the total of the integral value (P1) of the first peak, the integral value (P2) of the second peak, and the integral value (P3) of the third peak is 20% or more.

3. The curable polysilsesquioxane compound according to claim 1, having a weight average molecular weight of 500 to 5000.

4. The curable polysilsesquioxane compound according to claim 1, the curable polysilsesquioxane compound being a compound obtained by subjecting at least one alkoxysilane compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

5. The curable polysilsesquioxane compound according to claim 4, wherein the polycondensation catalyst is at least one compound selected from boric acid, citric acid, acetic acid, sulfuric acid, and methanesulfonic acid.

6. A method for producing the curable polysilsesquioxane compound according to claim 1, the method comprising subjecting at least one compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

7. A curable composition comprising the curable polysilsesquioxane compound according to claim 1, and a silane coupling agent.

8. A cured product obtained by heating the curable composition according to claim 7.

9. A method comprising using the curable polysilsesquioxane compound according to claim 1, as an optical device-securing material.

10. The curable polysilsesquioxane compound according to claim 2, having a weight average molecular weight of 500 to 5000.

11. The curable polysilsesquioxane compound according to claim 2, the curable polysilsesquioxane compound being a compound obtained by subjecting at least one alkoxysilane compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

12. The curable polysilsesquioxane compound according to claim 3, the curable polysilsesquioxane compound being a compound obtained by subjecting at least one alkoxysilane compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

13. A method for producing the curable polysilsesquioxane compound according to claim 2, the method comprising subjecting at least one compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

14. A method for producing the curable polysilsesquioxane compound according to claim 3, the method comprising subjecting at least one compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

15. A method for producing the curable polysilsesquioxane compound according to claim 4, the method comprising subjecting at least one compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

16. A method for producing the curable polysilsesquioxane compound according to claim 5, the method comprising subjecting at least one compound represented by $R^1Si(OR^2)_3$ (wherein $R^1$ is a substituted or unsubstituted aryl group, and $R^2$ are a hydrogen atom or an alkyl group having 1 to 10 carbon atoms, provided that $R^2$ are either identical or different) to polycondensation in the presence of a polycondensation catalyst.

17. A curable composition comprising the curable polysilsesquioxane compound according to claim 2, and a silane coupling agent.

18. A curable composition comprising the curable polysilsesquioxane compound according to claim 3, and a silane coupling agent.

19. A curable composition comprising the curable polysilsesquioxane compound according to claim 4, and a silane coupling agent.

20. A curable composition comprising the curable polysilsesquioxane compound according to claim 5, and a silane coupling agent.

* * * * *